US007821578B2

(12) United States Patent
Pathak et al.

(10) Patent No.: US 7,821,578 B2
(45) Date of Patent: Oct. 26, 2010

(54) RECONFIGURABLE SELF-CALIBRATING ADAPTIVE NOISE REDUCER

(75) Inventors: Bharat Pathak, Bangalore (IN); Nikhil Balram, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 1208 days.

(21) Appl. No.: 11/400,505

(22) Filed: Apr. 7, 2006

(65) Prior Publication Data

US 2007/0236609 A1    Oct. 11, 2007

(51) Int. Cl.
*H04N 5/21* (2006.01)
(52) U.S. Cl. .................. 348/607; 348/701; 348/627; 348/610; 348/620
(58) Field of Classification Search .......... 348/607, 348/620, 606, 610, 701, 452, 627; 382/275
See application file for complete search history.

(56) References Cited

U.S. PATENT DOCUMENTS

| 6,067,125 | A | 5/2000 | May |
| 6,975,758 | B2 | 12/2005 | Nicolas |
| 7,145,607 | B1 * | 12/2006 | Hui ........................ 348/607 |
| 2002/0034337 | A1 | 3/2002 | Shekter |
| 2002/0186894 | A1 | 12/2002 | Ferguson |
| 2003/0123750 | A1 | 7/2003 | Yu |
| 2003/0156301 | A1 | 8/2003 | Kempf et al. |
| 2006/0050783 | A1 | 3/2006 | Le Dinh et al. |

FOREIGN PATENT DOCUMENTS

| EP | 0 735 747 A1 | 10/1996 |
| WO | WO 01/35636 A | 5/2001 |

OTHER PUBLICATIONS

Russo, Fabrizio, "A Method for Estimation and Filtering of Gaussian Noise in Images," IEEE Transactions on Instrumentation and Measurement, vol. 52, No. 4, pp. 1148-1154, Aug. 2003.
Kim, Sung Deuk, et al., "A Deblocking Filter with Two Separate Modes in Block-Based Video Coding," IEEE Transactions on Circuits and Systems for Video Technology, vol. 9, No. 1, pp. 156-160, Feb. 1999.

* cited by examiner

*Primary Examiner*—David L Ometz
*Assistant Examiner*—Jean W Désir

(57) ABSTRACT

A video noise reducer reduces the noise artifacts in a video signal. The video noise reducer is reconfigurable to provide spatial noise reduction and temporal noise reduction in either a parallel or cascade architecture. The video noise reducer is self-calibrating by providing estimation modules that estimate the amount of noise in the video signal and a noise injector that confirms the measurement against a known quantity of noise. The video noise reducer is adaptive to solutions in hardware or a combination of hardware and firmware. The video noise reducer is also optimized for efficient memory usage in interlaced video signal processing applications.

20 Claims, 12 Drawing Sheets

RECONFIGURABLE SELF-CALIBRATING ADAPTIVE NOISE REDUCER

FIELD OF THE INVENTION

The present invention generally relates to signal processing applications. More particularly, the present invention is related to a system and method for a video noise reducer that is reconfigurable and self-calibrating to reduce noise in a video signal.

BACKGROUND

Real time video gets corrupted with many forms of noise. Additive white Gaussian noise (AWGN) is one of the most common noise forms that disturb video data. White or wideband Gaussian noise comes from many natural sources, such as the thermal vibrations of atoms in antennas, black body radiation from the earth and other warm objects, and from celestial sources such as the sun. Other types of noise may also be associated with a video signal depending on the format or compression type used with video signal.

Additional noise may be attributed to compression of the video signal. A compression artifact is the result of an aggressive data compression scheme applied to an image, audio, or video that discards some data which is determined by an algorithm to be of lesser importance to the overall content but which is nonetheless discernible and objectionable to the user. Artifacts in time-dependent data such as audio or video are often a result of the latent error in lossy data compression. Compression of a video signal results in particular types of artifacts that are a result of data loss.

Various techniques have been used to attempt to address the noise that occurs in a video signal. With digital displays becoming bigger, it becomes even more important to remove noise. Larger displays will make the noise more readily discernable to a viewer of the video. Many of the techniques applied are incomplete, resulting in a video signal that has its noise affects only marginally improved.

BRIEF DESCRIPTION OF THE DRAWINGS

Non-limiting and non-exhaustive embodiments are described with reference to the following drawings.

DETAILED DESCRIPTION OF THE PREFERRED EMBODIMENT

Figure 1:
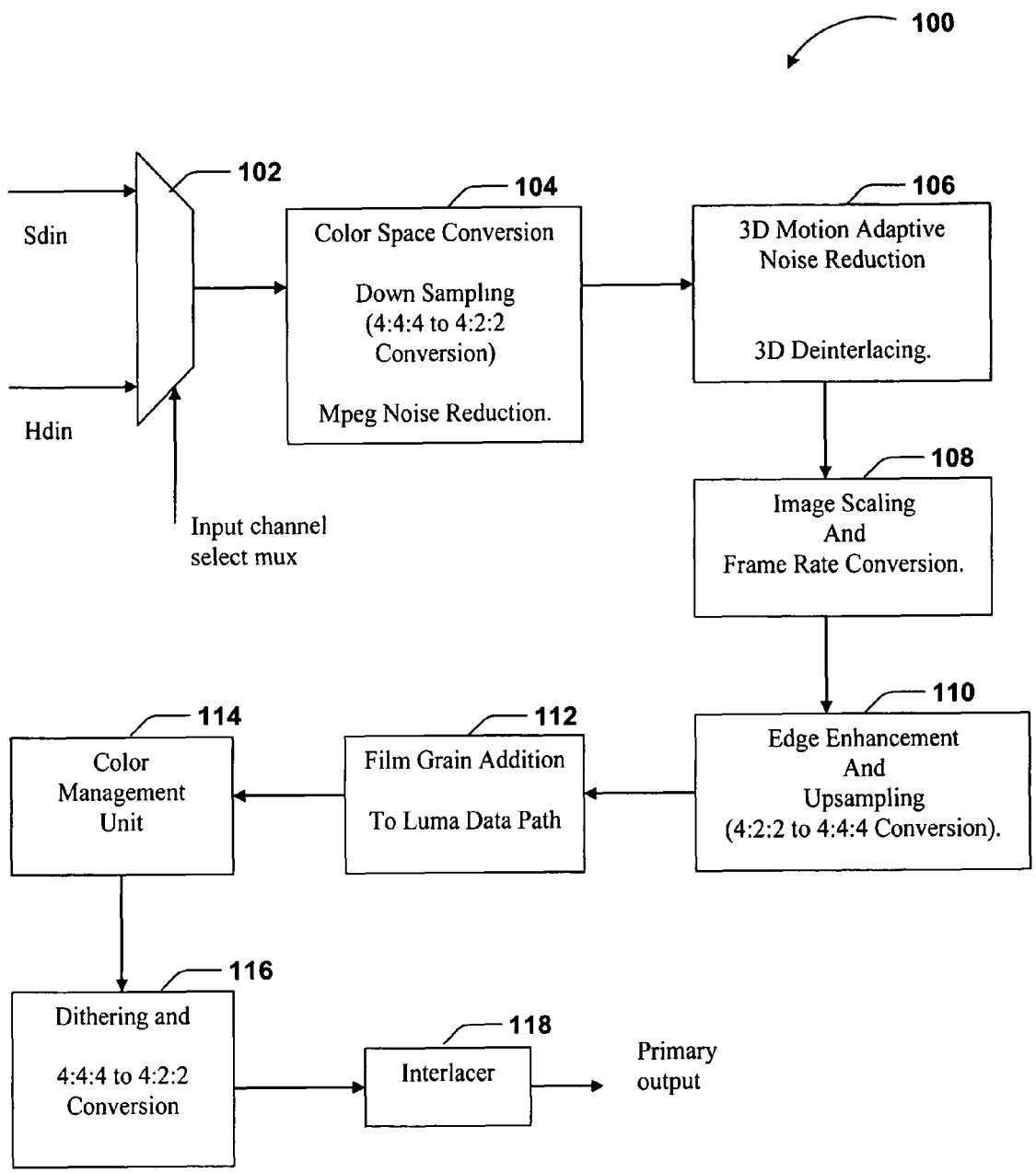
FIG. 1 illustrates an exemplary system in which the video noise reducer may operate.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, a video noise reducer is provided to process a video signal to reduce the presence of additive white gaussian noise (AWGN) and other noise-related artifacts. The noise reducer is reconfigurable to work in parallel or cascade configuration. The parallel configuration provides for a better reduction of AWGN, but may result in less noise reduction when the video is aggressively compressed (e.g., MPEG). When the video is aggressively compressed, the video noise reducer may be reconfigured into the cascade configuration, losing some amount of image details but at the same time being more effective in reducing noise related to compression.

Additionally, the video noise reducer is also self-configurable. A noise injector and noise measurement modules are included in the video noise reducer. The noise injector allows the video noise reducer to be calibrated for operation from a predictable noise level that has been injected. The noise measurement modules provided for measurement of the noise and adjustment of the video noise reducer parameters in order to reduce the noise based on the noise level measured. These aspects are described for fully below along with additional advantages and aspects of the video noise reducer described herein.

FIG. 1 illustrates an exemplary system in which the video noise reducer may operate, in accordance with the present invention. In the exemplary system (system 100) shown, the processing of video signal has a data path that includes an input channel selection mux (102), a color space conversion module (104), the video noise reducer (106), and image scaling and frame rate reduction module (108), an edge enhancement and upsampling module (110), a film grain addition module (112), an color management unit (114), a dithering and frame rate conversion module (116), and an interlacer (118).

System 100 may be included in audio/video (A/V) module that resides between various media devices and a display devices. In this instance, the noise cleanup is done in the A/V module. This A/V module may be a part of input source, for example a DVD player or HD recorder/player, or it may be a part of end display, or may possibly exist as an independent unit. An independent A/V module may house audio and video functionality like those shown as well as luma chroma separation, de-interlacing, additional noise reduction, scaling, additional color processing, audio delays, and additional processing modules.

Figure 2:
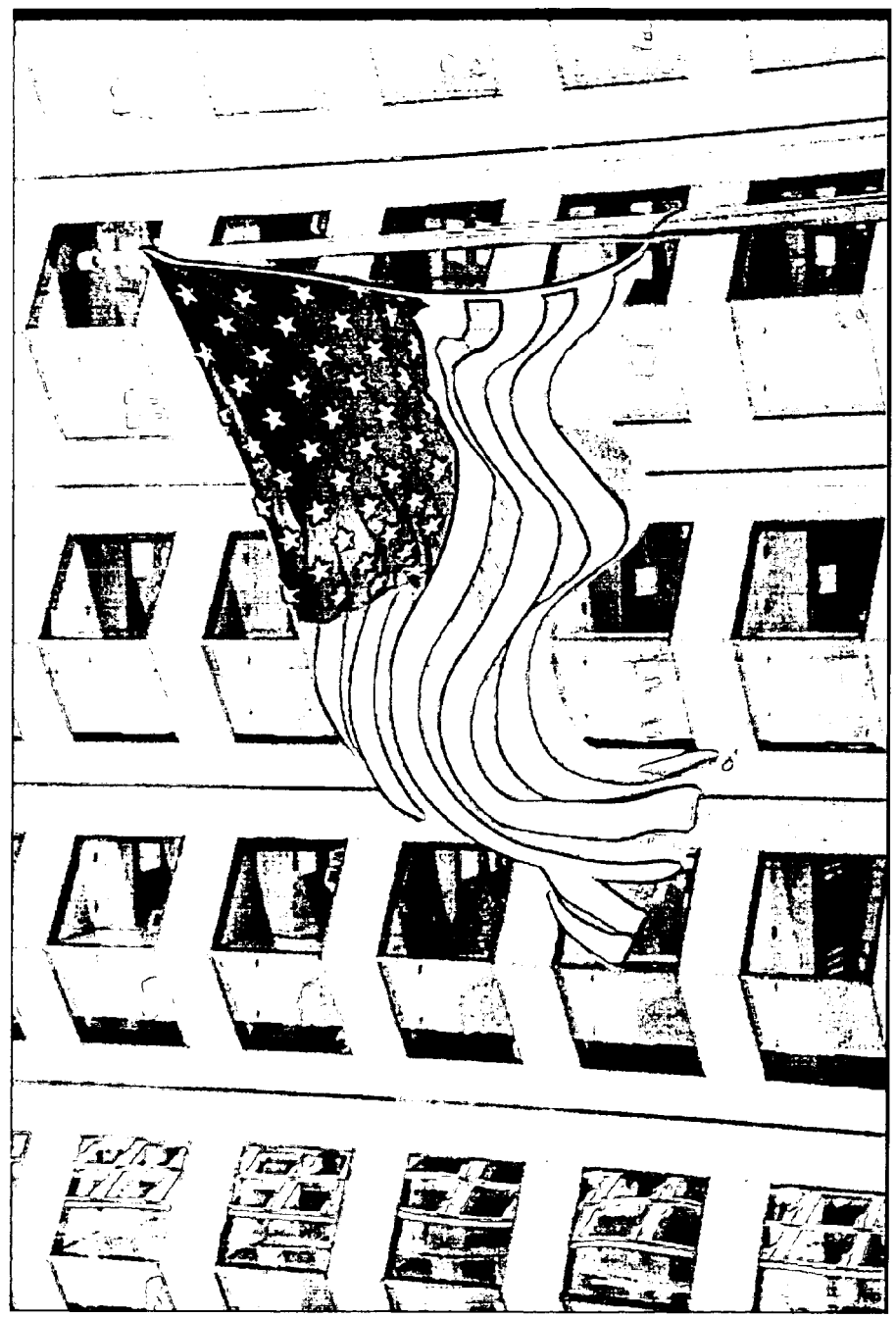
FIG. 2 illustrates an exemplary frame of video for input into the video noise reducer.

FIG. 2 illustrates an exemplary frame of video for input into the video noise reducer, in accordance with the present invention. The frame (200) illustrates an American flag with a building backdrop and shows no noise or compression artifacts because the frame of video has not yet been transmitted across a communication connection where AGWN may be introduced into the signal. Additionally, the frame (200) also does not include any compression artifacts since the video signal has not been compressed for transmission or been otherwise processed such that artifacts become apparent in the frame (200).

Figure 3:
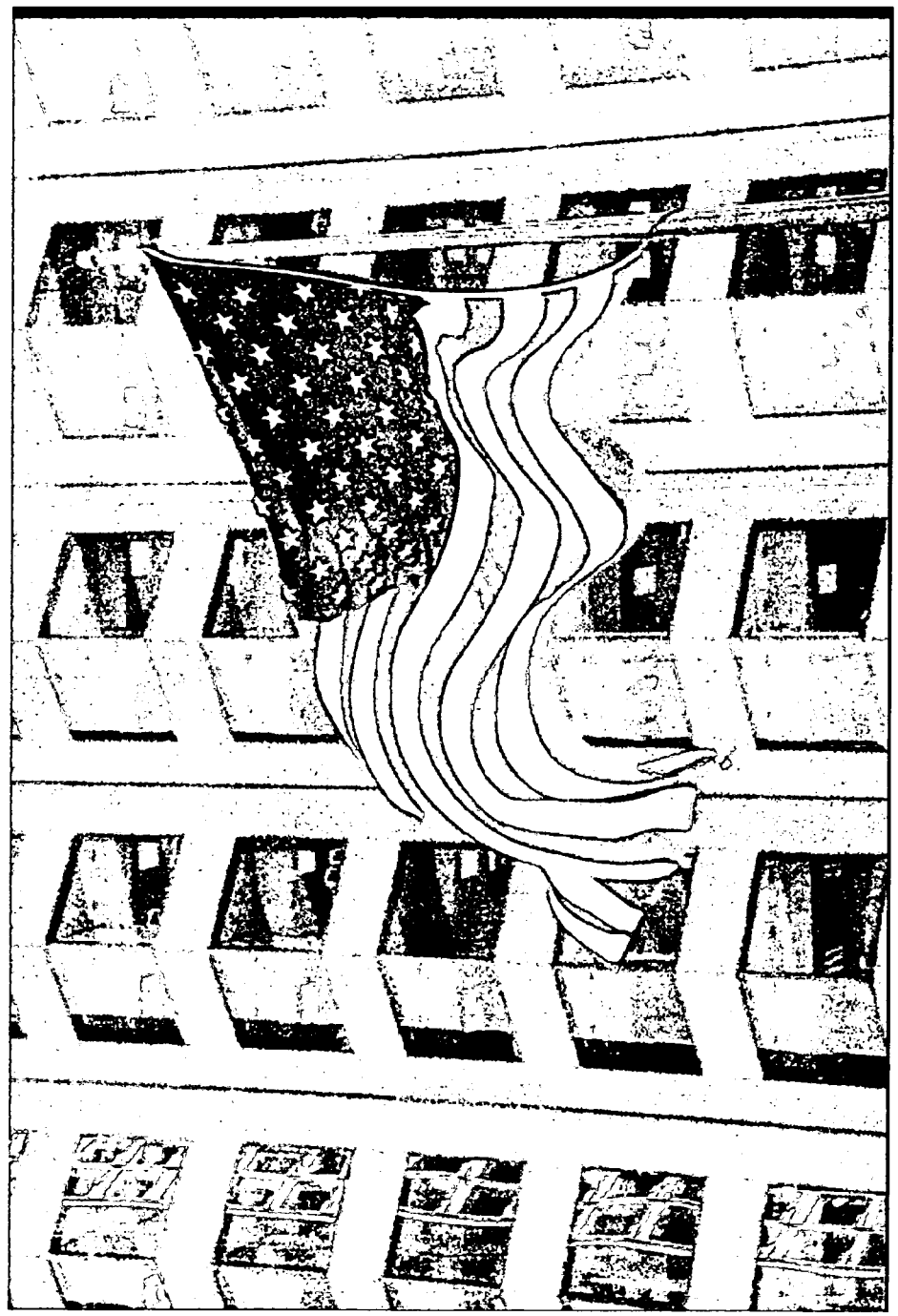
FIG. 3 illustrates an exemplary frame of video that includes noise from transmission of the video signal.

FIG. 3 illustrates an exemplary frame of video that includes noise from transmission of the video signal, in accordance with the present invention. The frame (300) illustrates the same frame of the input video signal shown in FIG. 2. In this frame, AWGN noise has been introduced into the video signal. The noise may be introduced through a natural occurrence or may have been introduced by a noise injector module (see FIG. 7). The AWGN results in a rougher image where the transitions between colors and objects have a noisy appearance on higher resolution displays.

Figure 4:
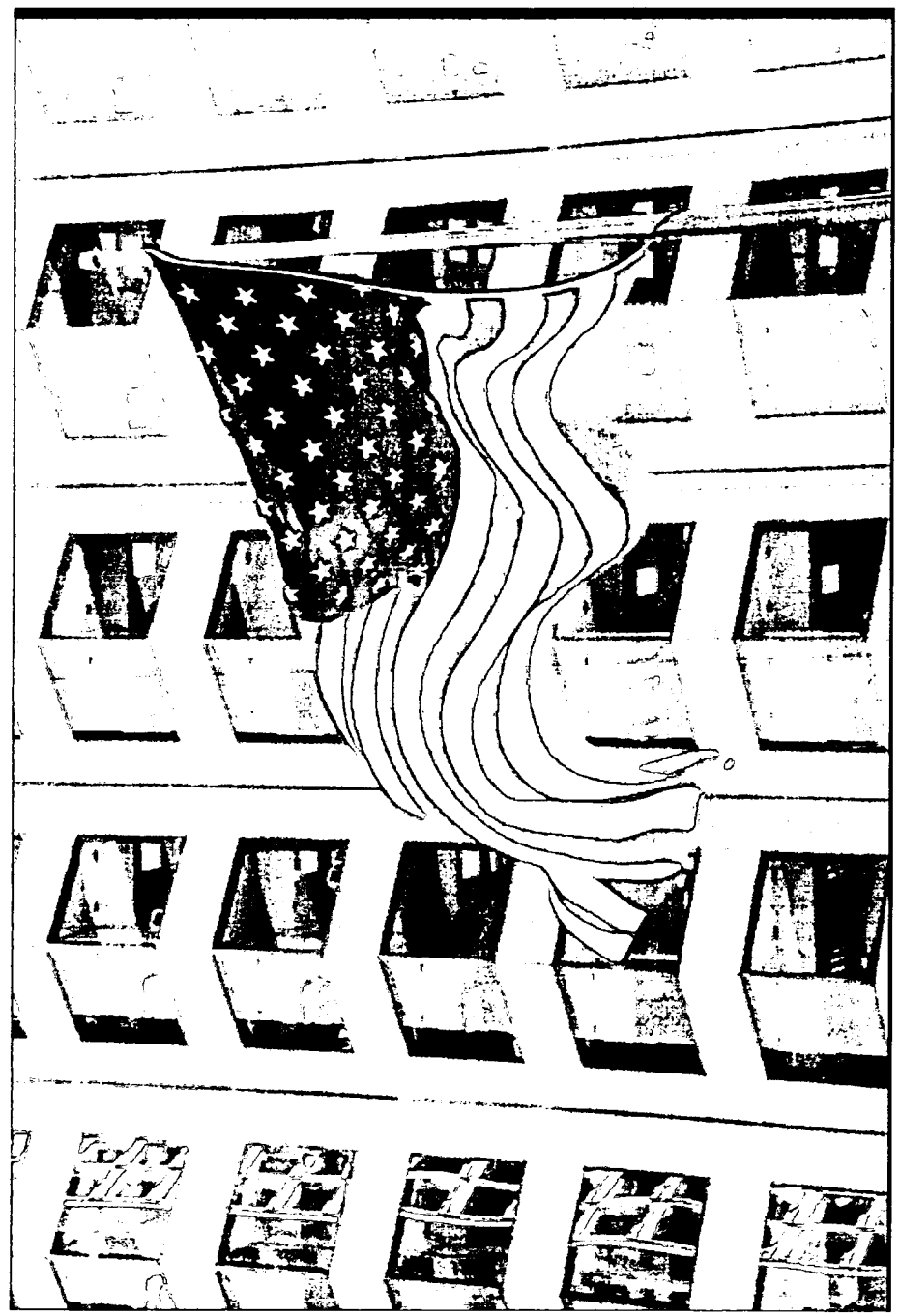
FIG. 4 illustrates an exemplary frame of video after being processed by the video noise reducer.

FIG. 4 illustrates an exemplary frame of video after being processed by the video noise reducer, in accordance with the present invention. The frame of video (400) corresponds to the frame of video shown in FIGS. 2 and 3. The frame (400) is processed with the video noise reducer configured in the parallel architecture (see FIG. 7 below). This configuration leads to removal of AWGN and at the same time preserves image details. In the parallel architecture, when the video image remains relatively static, then a temporal noise reducer (TNR) included in the video noise reducer is used to provide the output. When the video image includes objects in motion, a spatial noise reducer (SNR) included in the video noise reducer is used to provide the output. For intermediate motion cases, a weighted average of SNR and TNR output based on motion bits becomes the final output. As may be seen from the frame (400) the use of the video noise reducer can visibly improve the image quality.

Figure 5:
FIG. 5 illustrates an exemplary frame of video that includes noise from compression of a video signal.

FIG. 5 illustrates an exemplary frame of video that includes noise from compression of the video signal, in accordance with the present invention. In this frame (500), a clean image has been compressed using a JPEG compression with a quality factor=20. Thus, the compressed image has a significant amount of block noise and some amount of mosquito noise (diagonal edge ringing).

Figure 6:
FIG. 6 illustrates an exemplary frame of video after being processed by the video noise reducer.

FIG. 6 illustrates an exemplary frame of video after being processed by the video noise reducer, in accordance with the present invention. The frame shown (600) corresponds to the frame shown in FIG. 5. Because the principle amount of noise introduced in the image was due to compression, the video noise reducer was configured in a cascade mode of operation (see FIG. 7 below) to reduce the noise affect. In some cases, such as highly compressed video from analog cable or video-over-a-network ("IP video") and other applications where high compression ratios are applied, significant compression artifacts are present and these are best handled through the cascade structure that applies significant spatial filtering. As illustrated from the frame (600) the noise affects resulting from the compression have been visibly reduced.

Figure 7:
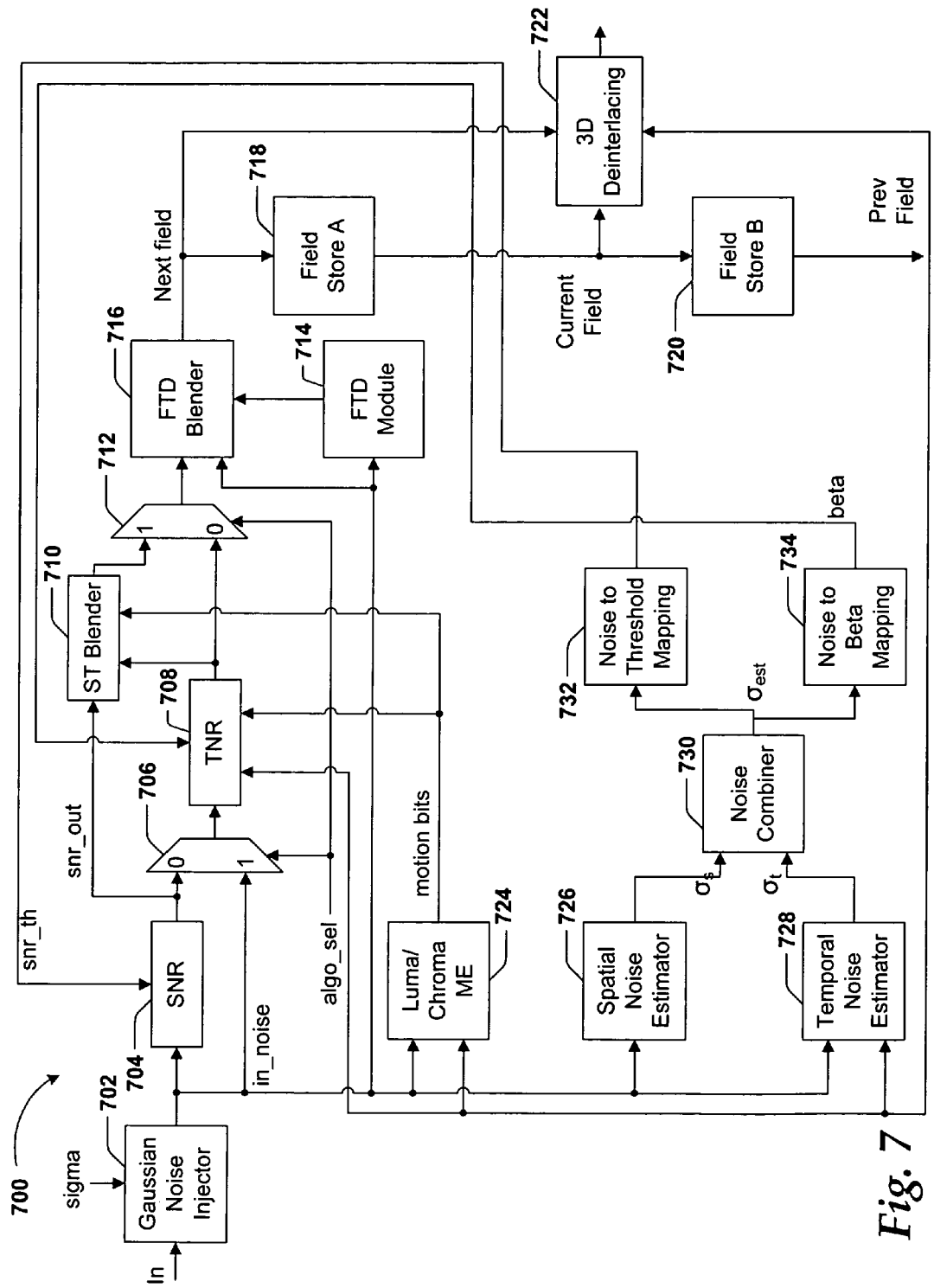
FIG. 7 illustrates an operational block diagram of the video noise reducer architecture.

FIG. 7 illustrates an operational block diagram of the video noise reducer architecture, in accordance with the present invention. The video noise reducer (700) includes a Gaussian noise injector (702), a spatial noise reducer (SNR) (704), multiplexers (706, 712), a temporal noise reducer (TNR) (708), a spatio-temporal blender (710), flesh tone detection (FTD) module (714), flesh tone detection (FTD) blender (716), field stores A and B (718, 720), 3D de-interlacing module (722), luma/chroma motion engine (ME) (724), spatial noise estimator (726), temporal noise estimator (728), noise combiner (730), noise to threshold mapping module (732), and noise to beta mapping module (734).

The operation of the video noise reducer (700) includes aspects that allow the video noise reducer (700) to be both reconfigurable and self-calibrating. First, the video noise reducer (700) may be configured to either a cascade architecture or a parallel architecture depending on the type and amount of noise included in the video signal. Secondly, the video noise reducer is self-calibrating. Modules are included, as explained further below, for detecting the amount of noise in the video signal and injecting noise into the video signal in order to calibrate the video noise reducer (700) for optimal operation.

Once the input video signal (In) is provided to the video noise reducer (700), the signal is propagated through the Gaussian noise injector (702) where a determination is made whether to add AWGN to the video signal (In). The noise may be set according to a selected sigma (standard deviation of gaussian noise distribution) level. The new signal (in_noise) may have noise injected by the Gaussian noise injector (702) or no noise injected.

The new signal (in_noise) is then propagated to the spatial noise reducer (SNR) (704). The SNR (704) reduces the noise in the video signal in the spatial domain. Noise reduction in spatial domain is most often accomplished by using an edge adaptive video filter. By using edge adaptive video low pass filter the image edges are preserved and the noise reduction happens in less detailed areas. One such common edge adaptive video filter is described in a reference entitled, "A Method for Estimation and Filtering of Gaussian Noise in Images" (Fabrizio Russo, IEEE Transactions on Instrumentation and Measurement, vol. 52, no. 4, august 2003).

In the Russo reference, a kernel size of 3×3 pixels is selected for estimating and filtering of the noise in a single pixel. In accordance with one embodiment of the present invention, a kernel size of 3 lines by 5 pixels is used to correspond to video signals that are working in interlaced domain. In accordance with one practical aspect of the SNR (704). a 3×5 kernel may be implemented by using 2 line buffers of size 720×16 (for SDTV) and 1920×16 (for HDTV). In one embodiment, the line buffers are implemented using on-chip single port static RAMs. The noise reduction happens on per pixel basis for both the luma as well as the chroma values of the pixels.

Figure 8:
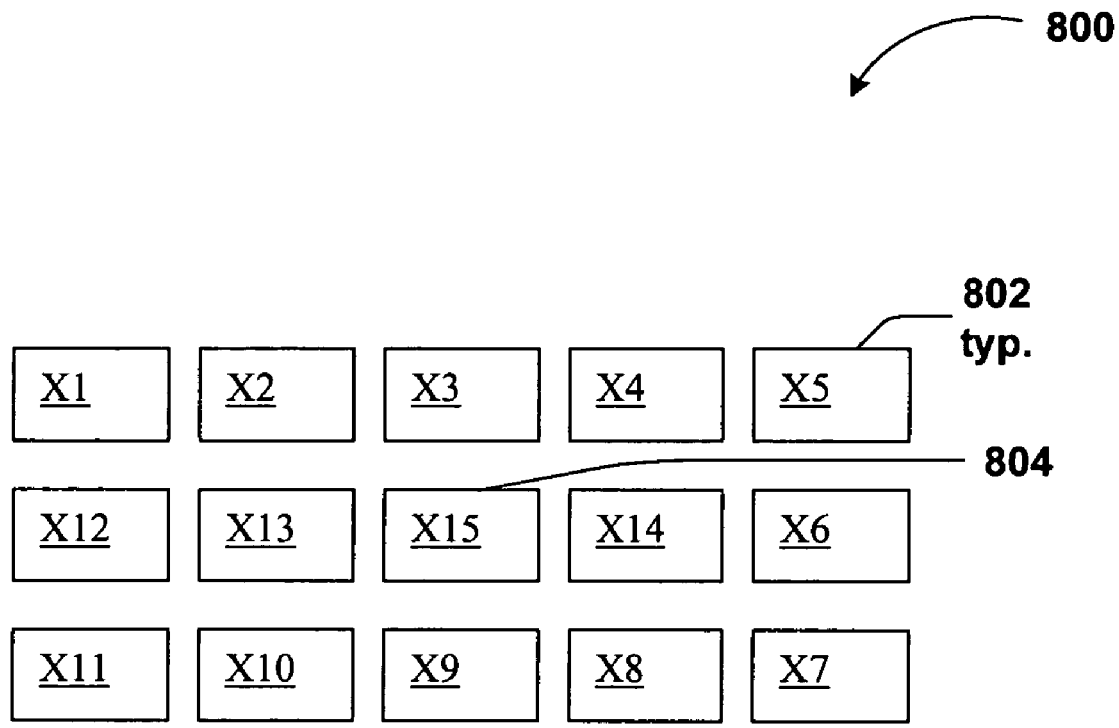
FIG. 8 illustrates an example of the kernel pixels corresponding to operation of a spatial noise reducer.

Turning briefly to FIG. 8, an example of the kernel pixels corresponding to the spatial noise reducer are shown, in accordance with the present invention. Each neighboring kernel pixel (e.g., 802) in the window (800) are used to generate the output pixel (804) whose position corresponds the center pixel X15 of the kernel. This implies that for generation of any output pixel, 2 pixels at the left, 2 pixels to the right, 1 line on the top and 1 line at the bottom are considered for the generation. For example, assume an attempt is being made to generate an output pixel Y15. The equation for the output pixel is given as, $$Y[15] = X[15] + \frac{1}{14} \cdot \sum_{i=1}^{14} Zeta(X[i], X[15]) \quad \text{(Eq. 1)}$$

The parameter "Zeta" is defined as, $$Zeta(U, V) = \begin{cases} U - V & |U - V| <= Th & \text{(Eq. 2)} \\ \frac{3 \cdot Th - |U - V|}{2} \cdot Sign(U - V) & Th < |U - V| <= 3*Th & \text{(Eq. 3)} \\ 0 & |U - V| > 3*Th & \text{(Eq. 4)} \end{cases}$$

The threshold parameter "Th" controls the amount of noise reduction. If threshold value is set to "0" no noise reduction will take place, which is equivalent to bypassing the SNR (704). The threshold parameter in the equations above corresponds to the threshold signal (snr_th) received from the noise to threshold mapping module (732) described further below. In one embodiment, a threshold value ranging from 10 to 32 was found to be optimum for video applications.

From Equation 1 an inference may be made that if there is too much deviation between neighboring pixel and center pixel, the neighboring pixel is quite different than the center pixel and accordingly such pixels should be excluded. Excluding the neighboring pixel leads to less blurring of the edges. Edge adaptive video filtering in spatial domain is a common approach to remove Gaussian noise. In spatial domain it is difficult to differentiate between actual video data and noise, as they share the same frequency spectrum. Hence spatial domain techniques may be less efficient in terms of Gaussian noise removal, since they may inherently end up blurring the image.

Turning back to FIG. 7, in addition to reducing the noise of the video signal in the spatial domain, the video signal may also be processed by the temporal noise reducer (TNR) (708). Gaussian noise in video data is assumed to have a zero mean. This assumption is very reasonable as any dc offsets in video data may be corrected. Therefore, performing an average over large number of similar samples will result in a clean signal. The average of the noise component will go to zero. In real time processing, using multiple frames poses multiple challenges in terms of hardware implementation. Using multiple frames for temporal noise reduction usually requires storing these frames in some form of storage, usually "off-chip". Such off-chip storage may exist in the form of SDRAM/DDRAM integrated circuits. Since these memories are external and exist on the board it can add to the system cost. One frame of SDTV size typically requires around 691 Kbytes of storage space. For high definition case this becomes 4 Mbytes. The larger the number of frames used for averaging the samples essentially means increase in off-chip storage. From signal processing theory it is known that feedback architectures give better magnitude response as compared to feed forward architectures. Hence, in one embodiment, the TNR (708) is designed as first order IIR feedback recursive structure.

Figure 9:
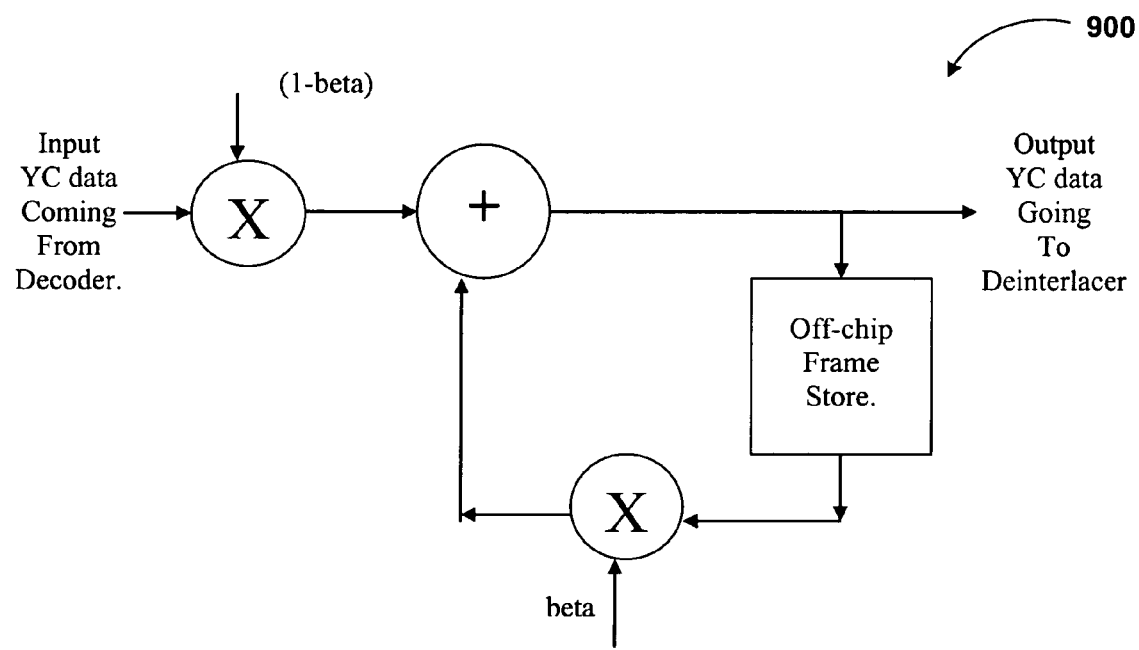
FIG. 9 illustrates an exemplary temporal noise reducer architecture.

Turning briefly to FIG. 9, an exemplary temporal noise reducer architecture is illustrated, in accordance with the present invention. The exemplary TNR shown (900) is designed as first order IIR feedback recursive structure. The time domain difference equation for the TNR shown can be written as:

$$Y[n] = (1-beta) \cdot X[n] + beta \cdot Y[n-1] \quad \text{(Eq. 5)}$$

And the z domain transfer function can be written as:

$$H(z) = \frac{1 - beta}{1 - beta \cdot z^{-1}} \quad \text{(Eq. 6)}$$

Using Equation 5, a magnitude response may be plotted with changing values of feedback factor "beta". The feedback factor can take on values ranging from 0 to 1 (excluding 1). At beta=1 the loop becomes unstable i.e. the input gets disconnected and whatever is there in frame buffer continues to re-circulate. In one embodiment, beta is determined by the noise to beta mapping module (734) described below.

Figure 10:
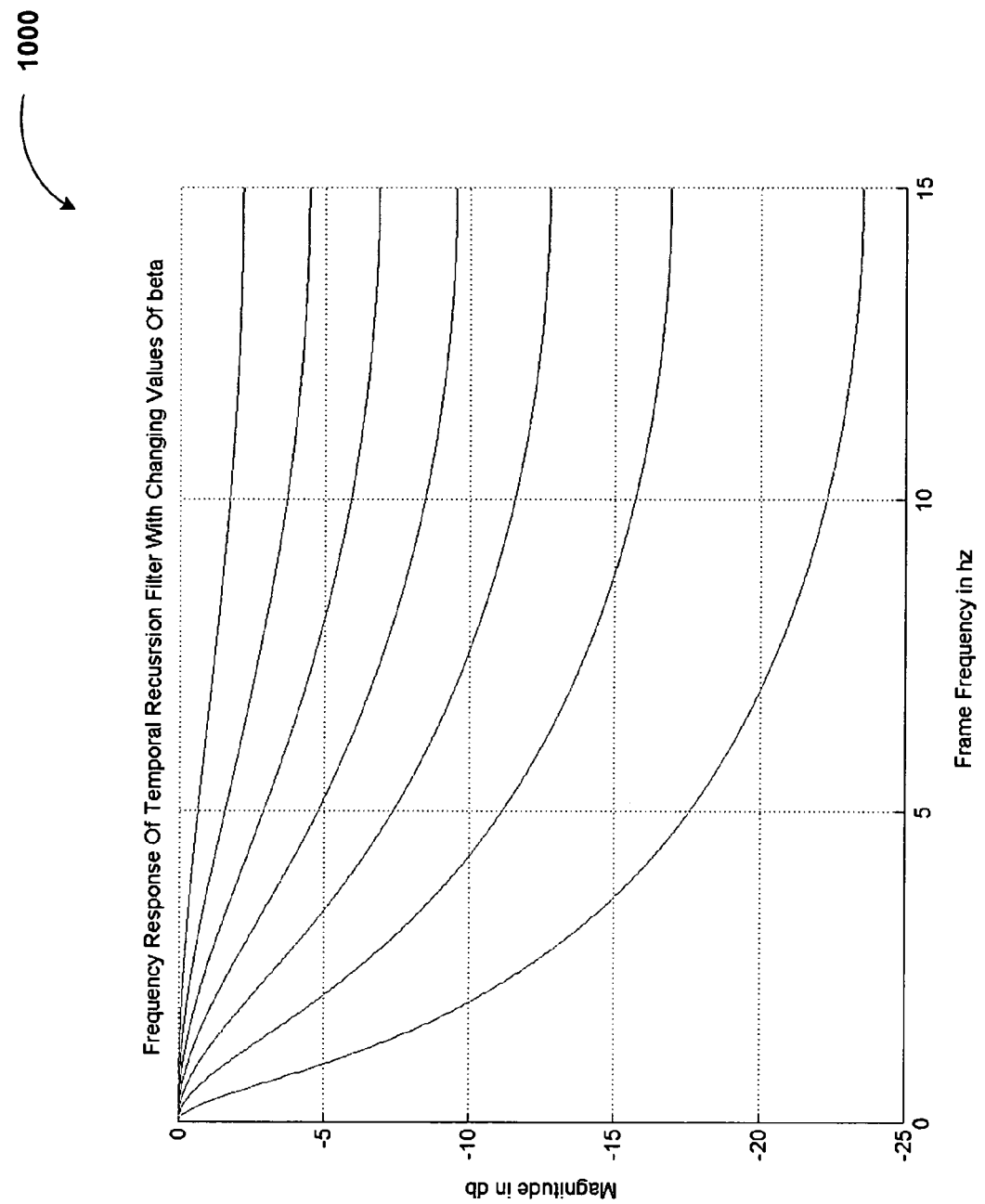
FIG. 10 illustrates a magnitude response of a temporal noise reducer with a changing feedback factor.

Turning further to FIG. 10, a magnitude response of the TNR (708) with a changing feedback factor "beta" is illustrated, in accordance with the present invention. Examining the response (1000), at "beta=0" no recursion happens and whatever is input into the TNR is passed as it is to the output. This is similar to an all-pass filter. As beta increases from ⅛ to ⅞ in steps of ⅛, high frequency regions are more attenuated. When an image is static than most of the image information lies at frame frequency=0 Hz point. The feedback factor "beta" controls the nature of the TNR filter. When the incoming video data does not contain noise then the feedback factor may be set to "=0". As the amount of noise in incoming video increases, the feedback factor is appropriately increased to create an effect of output video at a near constant quality. Table 1 illustrates the amount of signal-to-noise ratio (SNR) gain obtained with changing values of feedback factor beta.

TABLE 1

SNR gains versus feedback factor "beta".

| Feedback factor (beta) | SNR gain in decibels |
|---|---|
| 1/8 | 1.09 |
| 2/8 | 2.22 |
| 3/8 | 3.42 |
| 4/8 | 4.77 |
| 5/8 | 6.37 |
| 6/8 | 8.44 |
| 7/8 | 11.76 |

From Table 1, it is apparent that higher gains are achieved by increasing the feedback factor. However, increasing the feedback factor beta may present a problem. When things are static in an image most of the energy content is concentrated at dc frequency but as things start to move (motion cases) the spectrum becomes dynamic and has all frequencies from dc to 15 Hz. Increasing the feedback factor may make system more and more sluggish in nature so that it is unable to adapt to video signals with high levels of motion. The loop transients pan across more than one frame and take longer time to stabilize. If there is a scene change, the loop takes more than a couple of frames to stabilize. This may result in visual artifacts like "ghosting". The non-linear group delay response of the IIR filter adds a second degree of complexity in terms of visual artifacts in motion areas.

The architecture of the video noise reducer (700) makes the architecture reconfigurable so that spatial and temporal noise reduction may be selectively blended to produce an optimal output video signal. Turning back to FIG. 7, luma/chroma motion engine (ME) (724) is used to determine the level of blending for each pixel of the field in the incoming video signal.

It is known that Gaussian noise may be removed in temporal domain for static regions of scene, but temporal noise reduction causes ghosting artifacts in motion areas of the scene. The luma/chroma ME (724) provides a per pixel mechanism to classify the pixel of interest into static region or motion region. If the luma and chroma values for a pixel are very different between frames, then the pixel has a high motion level. However, if the luma and chroma values change little, then the motion level is low. Based on the degree of motion the final output of noise reducer can be a blended function of SNR's output and TNR's output.

In one embodiment, the motion bits calculation operates on the sliding window of size 3 lines by 5 pixels. It requires a temporal tap, i.e. 15 data values are taken from incoming field and 15 data values are taken from previous field (which is one frame apart). Mean absolute deviation (MAD) of 15 values is computed. The MAD value is then compared with 7 register programmable threshold values to quantize the degree of motion. This gives us 3 bits of motion information where "000 signifies that the pixel is static", "111 signifies that the pixel is in high motion" and balance values signify intermediate levels of motion.

These motion bits may then be provided to the spatio-temporal (ST) blender (710). ST blender (710) assigns weights to the output of the SNR (704) and the output of the TNR (708) based on the motion bits. The equation of the blender output is given as $$\text{blend\_out} = m \cdot \text{SNR\_out} + (1-m) \cdot \text{TNR\_out} \quad \text{(Eq. 7)}$$

Here "m" signifies amount of motion. In one embodiment, the value of m ranges from 0/8 to 7/8 in steps of 1/8. Table 2 summarizes the relationship between motion bits and blend factor.

TABLE 2

Relationship between motion bits and blend factors.

| Motion Bits | SNR Weight Factor (m) | TNR Weight Factor (1-m) |
|---|---|---|
| 000 | 0/8 | 8/8 |
| 001 | 1/8 | 7/8 |
| 010 | 2/8 | 6/8 |
| 011 | 3/8 | 5/8 |
| 100 | 4/8 | 4/8 |
| 101 | 5/8 | 3/8 |
| 110 | 6/8 | 2/8 |
| 111 | 7/8 | 1/8 |

Beyond the ability to blend the outputs of the SNR (704) and the TNR (708) is the ability to reconfigure the architecture of the video noise reducer (700) to optimize the noise reduction. By programming a register bit (algo_sel), the architecture may have the SNR (704) and the TNR (708) in cascade or in parallel mode of operation. For example, when "algo_sel=0" a cascade mode of operation is selected using the multiplexers (706, 712), and when "algo_sel=1" a parallel mode of operation is selected.

The z-domain output equation of the cascade architecture may be written as:

$$Y(z) = \frac{\text{beta}}{1 - (1 - \text{beta})z^{-1}} \cdot X_s(z) \quad \text{(Eq. 8)}$$

In Equation 8, "beta" is the recursion coefficient, which is controlled by the motion bits, and $X_s[z]$ is the SNR's (704) output.

TABLE 3

Motion bits to "beta" mapping.

| Motion Bits | Recursion Coefficient ("beta") |
|---|---|
| 000 (Static Pixels) | 7/8 |
| 001 | 6/8 |
| 010 | 5/8 |
| 011 | 4/8 |
| 100 | 3/8 |
| 101 | 2/8 |
| 110 | 1/8 |
| 111 (Pixels in high motion) | 0/8 |

An exemplary motion bits to "beta" mapping are shown in Table 3. From Table 3 it is observed that if the pixel belongs to static area of video frame then the recursion value is set to maximum thus giving maximum noise reduction in static areas. But when pixels are in maximum motion then the recursion coefficient "beta" is set to "0/8" thus creating the effect of TNR bypass. This is a desired effect, as when things are in motion any amount of temporal recursion can cause ghosting artifacts.

There are two possible disadvantages with cascade architecture. The cascade architecture may result in un-necessary blurring in static areas, and since the motion bits control the feedback recursion coefficient, the recursion engine works even when the incoming video is clean in nature (does not contain Gaussian noise) and may lead to un-necessary ghosting artifacts in medium motion areas of the scene.

The cascade architecture leads to a significant amount of noise reduction as the image is filtered by SNR (704) first and then the filtered image is passed through TNR (708). This significant amount of smoothening is sometimes desirable when dealing with compression artifacts like mosquito noise and removal of blocking artifacts (see FIGS. 5 and 6) or when the noise levels are high in the incoming video.

In the parallel architecture the SNR (704) and the TNR (708) are arranged in parallel. The output is then blended using the ST blender (710) as described above. This configuration leads to removal of Gaussian noise and at the same time preserves image details. In the parallel architecture, when the image is static then the TNR's (708) output becomes the final output and when the image is in motion the SNR's (704) output becomes the final output. For intermediate motion cases weighted average of SNR and TNR output based on motion bits becomes the final output. The output equation (z-domain) for parallel architecture can be written as:

$$Y(z) = m \cdot X_s(z) + (1-m) \cdot \frac{1 - \text{beta}}{1 - (1-m) \cdot \text{beta} \cdot z^{-1}} \cdot X(z) \quad \text{(Eq. 9)}$$

In Equation 9, according to one embodiment, "m" signifies motion bits and its value ranges from ⅜ to ⅞ in steps of ⅛ and "beta" signifies feedback factor. $X_s[z]$ is the output of SNR block.

As described above, the parallel structure may be the approach for reducing AWGN without degrading image quality. However, in some cases, such as highly compressed video from analog cable or video-over-a-network ("IP video") and other applications where high compression ratios are applied, significant compression artifacts are present and these are best handled through the cascade structure that applies significant spatial filtering. The reconfigurability of this architecture allows the best structure to be chosen by software or another circuit dynamically from one input source selection to the next or even from one frame to the next.

Once the video signal is processed by the SNR (704) and the TNR (708) and blended by the ST blender (710), the video signal is processed by the flesh tone detection (FTD) module (714). If noise reduction is done in skin regions then these areas appear slightly softer in nature. In the video domain, the appearance of skin tone is one of the most important visual calibration criteria. Generally, people would like to preserve the appearance of skin regions as much as possible. In these regions some amount of noise presence is more desirable than making these regions noise free with loss of small details like pores of skin or smudging of beard. Hence, the video noise reducer (700) detects pixels in an image, which belong to skin or flesh regions and allow them to pass directly to the output without undergoing noise reduction. Since a binary switch between skin and non-skin areas may generate visible artifacts near the skin boundaries the FTD blender (716) operates to smooth these regions based on the degree of skin tone. Exemplary blend factors for filtered and unfiltered pixels based on amount of skin tone is given in Table 4.

TABLE 4

Blend factors of filtered and unfiltered pixel based on amount of skin tone detected.

| Amount of Skin Tone | Weight factor of VNR pixel | Weight factor of unfiltered pixel |
| --- | --- | --- |
| 00 (no skin region) | 1 | 0 |
| 01 | 3/4 | 1/4 |
| 10 | 1/2 | 1/2 |
| 11 (maximum skin region) | 1/4 | 3/4 |

Using blend factor similar to those in Table 4 allows the flesh tone of the image to be preserved while reducing the noise present in the video signal. The FTD blender's (716) output is provided to the field stores (718, 720) and to the output for further processing. In the example of FIG. 7, the output is provided to a 3D de-interlacing module (722) so that 3D de-interlacing may be applied. Recursive data is provided from the field stores (718, 720) for processing the video signal in the temporal domain, for determining the motion bits, and for estimating the noise in temporal domain.

Estimation of the noise in both the spatial and temporal domains is performed by the spatial noise estimator (726) and the temporal noise estimator (728). Either approach for noise estimation may be used, but an additional approach uses both methods of noise estimation and combines the results based on appropriate criteria. One effective criteria is to use the MAX of the two noise estimates as a conservative estimate for the actual noise variance.

Figure 11:
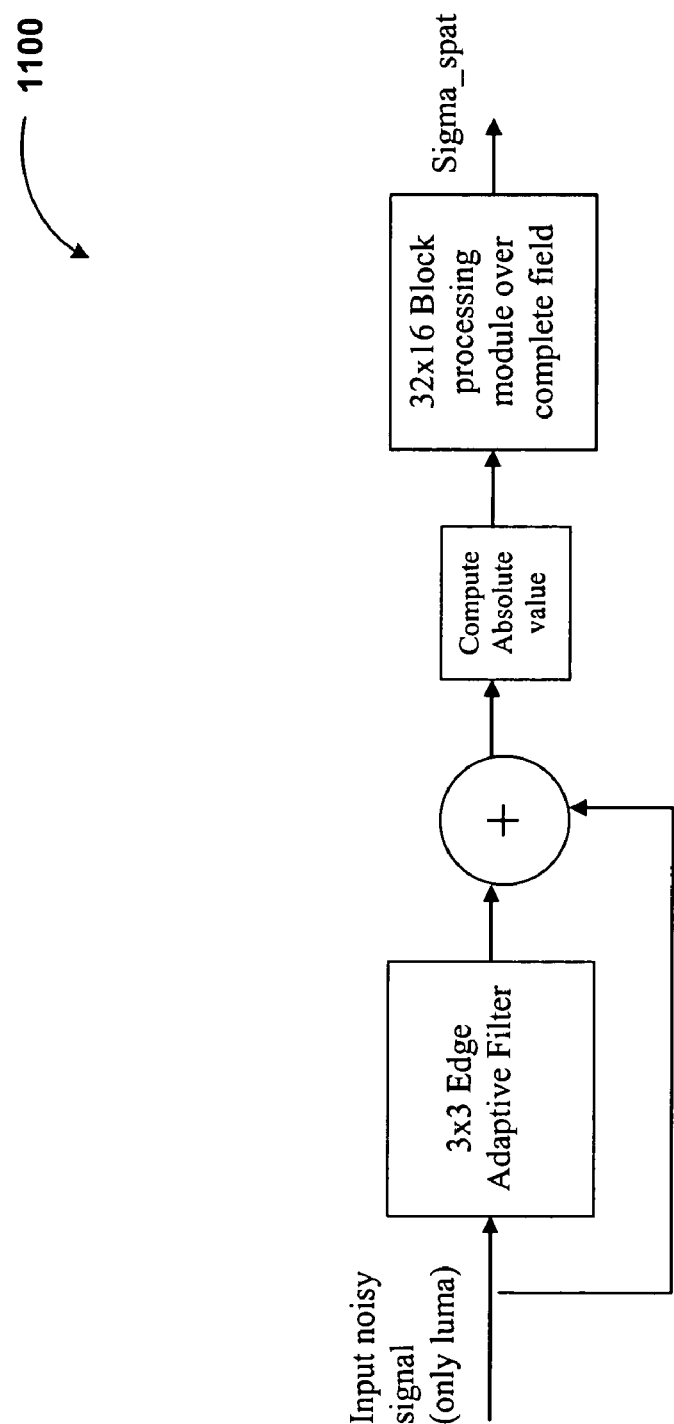
FIG. 11 illustrates an exemplary block diagram for a spatial noise estimator.
Figure 12:
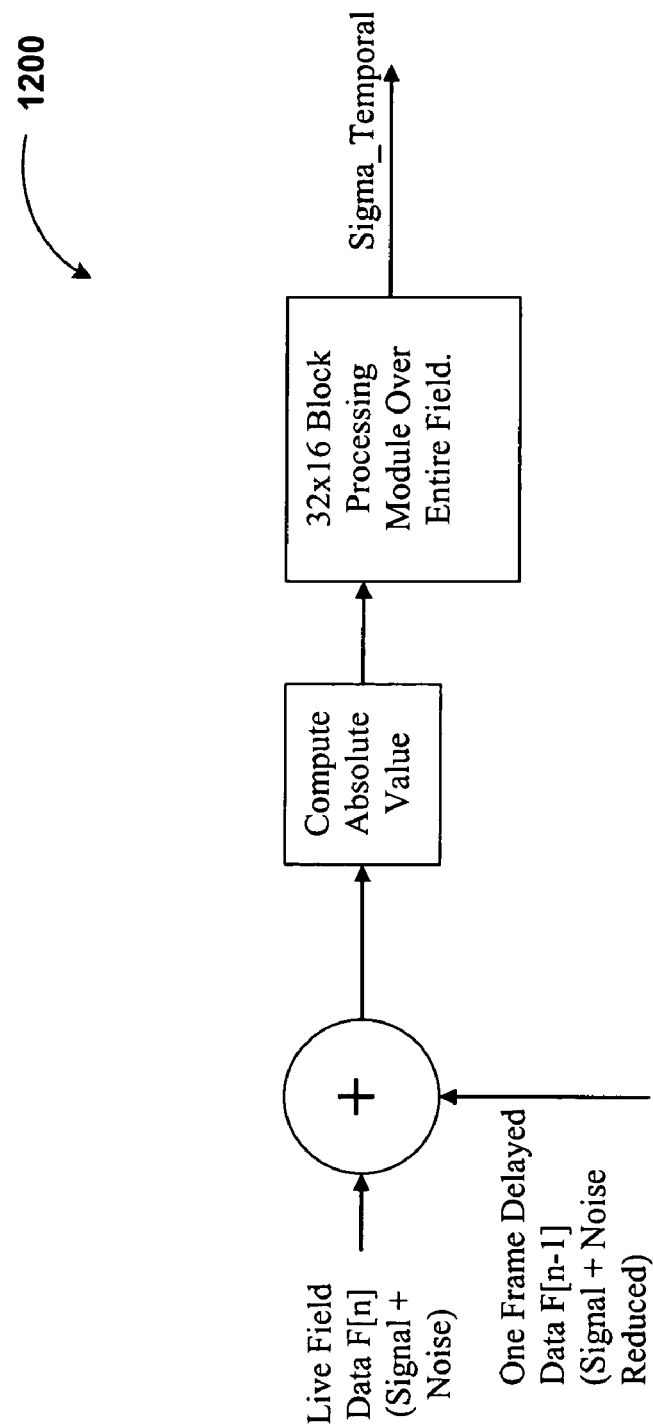
FIG. 12 illustrates an exemplary block diagram for a temporal noise estimator, in accordance with the present disclosure.

The spatial noise estimator (726) receives as the input, the noisy input video signal (in_noise). Turning briefly to FIG. 11, an exemplary block diagram for a spatial noise estimator is shown, in accordance with the present invention. The signal plus noise data is then fed to an edge adaptive video spatial filter (described above). At the output of the filter a noise-reduced signal is obtained. The input noisy signal (in_noise) is subtracted with the output of edge adaptive video filter, which results in calculation of the noise component and some amount of image leakage. Absolute value of the difference signal is then fed to a block-processing unit. The output of the block-processing unit gives the spatial noise estimate value (sigma_spat or $\sigma_s$). In the block-processing module the field data is sub-divided into blocks of size 32×16. The mean absolute deviation values for each block is computed and stored. At the end of the field, the minimum of all mean absolute deviations is taken as a spatial estimate of Gaussian noise. The temporal noise estimator (728) is similar to the spatial noise estimator (726). The temporal noise estimator (728) estimates the temporal noise from an input of a live incoming field and one frame delayed version of the data. This one frame delayed version of data comes from the field store (720). Since the video noise reducer's (700) output gets stored inside the field stores, the data that loops back to the temporal noise estimator is the noise filtered and frame delayed video data. Live incoming field data and the one frame delayed data is fed to the temporal noise estimator (728). Turning briefly to FIG. 12, an exemplary block diagram for a temporal noise estimator is shown, in accordance with the present invention. The absolute difference is computed which is then fed to a block-processing unit. This block-processing unit is same as the one described for the spatial noise estimator (726). The final output of the block-processing unit is the temporal noise estimate value (Sigma_Temporal or $\sigma_t$).

Once the noise estimates ($\sigma_s$, $\sigma_t$) are determined by the spatial noise estimator (726) and the temporal noise estimator (728), the estimates may be combined by the noise combiner (730). The noise combiner (730) combines the two noise estimates into a combined noise estimate ($\sigma_{est}$). The combined noise estimate ($\sigma_{est}$) may then be input to the noise to threshold mapping module (732) and the noise to beta mapping module (734). These modules determine the levels of snr_th and beta that need to be provided to the SNR (704) and the TNR (708) respectively for the various noise levels that may be encountered in the video signal.

In addition to the noise estimators (726, 728), the video noise reducer (700) also includes a Gaussian noise injector (702). The purpose of the Gaussian noise injector (702) is to evaluate the performance of video noise reducer (700) and specifically the noise estimators (726, 728). The on-chip noise injector is also helpful in effective demonstration of video noise reducer's performance to the customers without the need of an external noise injector. The on-chip noise injector is programmable in nature, meaning user can accurately control how much amount of noise injection (in terms of sigma) should happen to the incoming video data. In one embodiment, the supported range of injected noise value ranges from "sigma=0" to "sigma=31" in steps of 1. In a further embodiment, Gaussian noise injector is based on Box-Muller method of noise generation. Pseudo-random numbers are easy to generate in hardware using linear feedback shift registers (LFSR) and a polynomial equation based on the number of bits that we want to generate. Implementation of correct polynomial equation is required in order to maximize the repetition of generated pseudo-random numbers. The generated pseudo-random numbers are than fed to "sqrt-log" look up table and "sin" "cos" look up tables. The look up table values are then multiplied along with desired standard deviation value to get the final random numbers. The final numbers "X1" and "X2" have Gaussian properties.

With the Gaussian noise injector (702) included, the performance of both spatial and temporal noise estimators may be measured. Another advantage of this setup is that off-chip noise injectors are not need for calibration. By providing a known amount of noise to incoming clean video data, the measurements provided by the spatial and temporal noise estimators may be confirmed.

In the embodiment shown in FIG. 7, the output of the video noise reducer (700) is shown to include a 3D de-interlacing module (722). The reason that 3D de-interlacing module (722) is depicted (it is not necessary for operation of the video noise reducer), is to illustrate a hardware optimization available due to the video noise reducer's (700) design. De-interlacing is a process of converting interlaced field data to progressive frame data. It is one of the very common video-processing blocks as present day digital televisions have the capability to display progressive images. The 3D de-interlacing module (722) may also operate in spatio-temporal domain. The 3D de-interlacing module (722) looks for data from neighboring fields and the center field to create the information of pixels of missing lines. Since the 3D de-interlacing module (722) works of 3 fields of data, it also requires field store. With the efficient placement of video noise reducer (700) prior to the 3D de-interlacing module (722), the same field buffers may be used to achieve Gaussian noise reduction as well as de-interlacing functionality. With this sharing the SDRAM space requirement and data transfer bandwidth both are effectively halved. Although the interlaced input stream architecture has been described, the video noise reducer (700) can support both interlaced and progressive input streams.

In an additional embodiment, an option may be provided to control the noise reduction loop parameters either in hardware or through firmware, allowing the video noise reducer to be "adaptive". As described above, the SNR threshold and the TNR beta may be function of amount of noise present in the incoming video. Also, the noise estimator values may be reflected on the status registers, which in turn may be read by the firmware. Since the SNR threshold (snr_th) and TNR beta are also programmable through registers (via host interface), it is possible to close the loop in firmware. However, this may keep the CPU busy. Alternatively it is possible to close the loop between estimated noise value and loop parameters (SNR threshold and TNR beta) in hardware. The option of closing the loop either in hardware or through firmware may be controlled by programming a register bit. Hence the board designer has an option to close the loop in hardware or in software.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. An apparatus, comprising:
a spatial noise reducer that is arranged to reduce noise artifacts in a video signal in a spatial domain;
a temporal noise reducer that is arranged to reduce noise artifacts in a video signal in a temporal domain;
a tone determination module wherein tone of a pixel is determined, such that when a pixel is determined to correspond to a particular tone, then the spatial and temporal noise reducers are effectively skipped for that pixel;
a selector that automatically selects a mode of operation between a parallel mode and a cascade mode based at least in part on characteristics of the video signal, wherein the spatial noise reducer and the temporal noise reducer are arranged in a parallel configuration when the parallel mode is selected by the selector and in a cascade configuration when the cascade mode is selected by the selector; and
a noise estimator that is arranged to estimate a noise level associated with the video signal and provides an output corresponding to the noise level estimate, wherein parameters determined from the noise level estimate are provided to the spatial noise reducer and the temporal noise reducer to optimize reduction of the noise artifacts.

2. The apparatus of claim 1, further comprising a noise injector that is arranged to inject a predetermined level of noise into the video signal, such that the noise level estimate is calibrated from the predetermined level of noise.

3. The apparatus of claim 1, further comprising at least one field store that is arranged to provide recursive data to the temporal noise reducer and the noise estimator.

4. The apparatus of claim 3, wherein the field store is shared with a de-interlacing module.

5. The apparatus of claim 1, further comprising a luma/chroma motion engine that is configured to determine a level of motion for a pixel in the video signal according the difference in luma and chroma values that occurs between frames.

6. The apparatus of claim 5, further comprising providing the motion level of the pixel to a spatio-temporal blender, such that outputs from the spatial noise reducer and temporal noise reducer are blended on a per-pixel basis depending on the level of motion for each pixel.

7. The apparatus of claim 1, wherein the tone determination module is a flesh tone determination module wherein an amount of flesh tone in a pixel is determined, such that when a pixel is determined to correspond to a flesh tone, then the spatial and temporal noise reducers are effectively skipped for that pixel.

8. The apparatus of claim 7, further comprising a flesh tone determination blender, wherein a signal provided by the flesh tone determination module is used to blend between the video signal and a blend of the outputs of the spatial noise reducer and the temporal noise reducer, such that flesh tone preservation is balanced with noise reduction.

9. The apparatus of claim 1, wherein the parallel mode is selected when a principle portion of the noise level in the video signal is attributed to Gaussian noise.

10. The apparatus of claim 1, wherein the cascade mode is selected when a portion of the noise level in the video signal is attributed to compression artifacts.

11. The apparatus of claim 1, wherein the noise estimator further includes a spatial noise estimator and a temporal noise estimator.

12. The apparatus of claim 1, wherein the spatial noise reducer, temporal noise reducer, and noise estimator are included in a video noise reducer that is adaptive to implementations in at least one of hardware and a combination of hardware and firmware.

13. A method for reducing noise in a video signal, the method comprising:
receiving a video signal;
determining whether a pixel in the video signal is associated with a particular tone and avoiding noise reduction for those pixels;
automatically selecting a mode of operation between a cascade mode and a parallel mode based at least in part on characteristics of the video signal;

arranging a spatial noise reducer and a temporal noise reducer to process the video signal in a cascade configuration when the cascade mode is selected and a parallel configuration when the parallel mode is selected;

estimating a noise level associated with the video signal;

determining a motion level for each pixel in the video signal;

processing the video signal with both the spatial noise reducer and the temporal noise reducer to reduce noise artifacts in the video signal when the parallel mode is selected;

blending outputs of the spatial noise reducer and the temporal noise reducer based on a level of motion detected for each pixel; and processing the video signal with the spatial noise reducer followed by the temporal noise reducer to reduce noise artifacts in the video signal when the cascade mode is selected.

14. The method of claim 13, wherein an extent of noise reduction by the spatial noise reducer and the temporal noise reducer are each related to the noise level estimate.

15. The method of claim 13, further comprising injecting noise into the video signal to calibrate the estimation of the noise level and test performance of a video noise reducer.

16. The method of claim 13, further comprising determining whether a pixel in the video signal is associated with a flesh tone and avoiding noise reduction for those pixels.

17. The method of claim 13, further comprising blending between the video signal and a blend of the outputs of the spatial noise reducer and the temporal noise reducer according to a determination of whether a pixel in the video signal is associated with a flesh tone, such that flesh tone preservation is balanced with noise reduction.

18. The method of claim 13, further comprising storing an initial frame of the video signal in a field store such that data from the initial frame of the video signal is available for comparison to a subsequent frame of the video signal.

19. The method of claim 18, further comprising arranging the field store such that the field store is available for reducing noise in the video signal as well as de-interlacing the video signal.

20. A video noise reducer, comprising:

tone determination means arranged to determine tone of a pixel, such that when a pixel is determined to correspond to a particular tone, then spacial noise reduction means and temporal noise reduction means are effectively skipped for that pixel;

noise injection means arranged to inject noise into a received video signal when a selection is made to calibrate the video noise reducer;

noise estimation means arranged to estimate a noise level associated with the video signal;

the spatial noise reduction means arranged to reduce noise artifacts in the video signal in a spatial domain dependent on an output of the noise estimation means;

the temporal noise reduction means arranged to reduce noise artifacts in the video signal in a temporal domain dependent on the output of the noise estimation means;

configuration means arranged to automatically select a mode of operation between a cascade mode and a parallel mode based at least in part on characteristics of the video signal, wherein the spatial noise reduction means and the temporal noise reduction means are arranged in a cascade configuration when the cascade mode is selected or a parallel configuration when the parallel mode is selected;

motion level determination means arranged to determine a motion level for each pixel in the video signal; and blending means arranged to blend outputs of the spatial noise reduction means and the temporal noise reduction means according to an output of the motion level determination means.

* * * * *